United States Patent Office 3,522,248
Patented July 28, 1970

3,522,248
PROCESS FOR THE ISOLATION OF
CEPHALOSPORIN C
Walter Voser, Allschwil, Switzerland, assignor to Ciba Corporation, New York, N.Y., a corporation of Delaware
No Drawing. Filed Nov. 28, 1967, Ser. No. 686,343
Claims priority, application Switzerland, Dec. 5, 1966, 17,309/66
Int. Cl. C07d 99/24
U.S. Cl. 260—243
9 Claims

ABSTRACT OF THE DISCLOSURE

Process for isolating cephalosporin C from a dilute aqueous solution in the form of the N-trinitrophenyl derivative by reacting the cephalosporin C-containing solution with trinitrobenzene sulfonic acid.

---

The present invention provides a new process for isolating cephalosporin C in the form of a derivative from dilute solutions containing cephalosporin C, especially from solutions containing cephalosporin C in admixture with other dissolved substances, above all from a culture liquid containing cephalosporin C.

The isolation of cephalosporin C from dilute aqueous solutions "contaminated" with further water-soluble substances, especially from culture liquids, is complicated and involves difficulties especially when working on an industrial scale, because, on the one hand, cephalosporin C is very sensitive and, on the other hand, it must be separated from other substances some of which have similar physical and chemical properties.

As a process for isolating cephalosporin C from fermentation liquids it has been proposed, for example, to adsorb cephalosporin C on active carbon, to elute it, to absorb the eluted material on alumina, once more to elute, to adsorb it on an anion exchange resin, to elute the crude cephalosporin C with an aqueous buffer solution of pH 2.5 to 8.0, for example pyridine acetate, and to subject the crude product to a solvent extraction; compare German Pat. 1,014,711. According to another process cephalosporin C is obtained by solvent fractionation, especially between water and phenol or an alkyl-substituted phenol. As a further route it has been proposed to treat eluates from the active carbon column or the alumina column or the column of an ion exchange resin under temperature and acidity conditions under which the cephalosporin N contained in the culture filtrate is converted into penicillinic acid but cephalosporin C is left practically unaffected, or to decompose cephalosporin N with penicillinase and then to isolate cephalosporin C by fractionated extraction with solvents or by chromatography on an ion exchange resin. It has also been attempted to adsorb cephalosporin C from the acid-treated medium directly with the use of an ion exchange resin, but this direct adsorption had the disadvantages that, owing to the presence of anions other than cephalosporin C, a large quantity of anion exchange resin was needed, and over and above this the chloride ions were eluted at the same time and caused difficulties in the subsequent steps of the process. Finally, a process has been described in which the clarified fermentation medium is adjusted with a cation exchange resin, containing strong acid groups, in the H+ form to pH=2.8 to 4.0, then to separate the cation exchange resin from the acidified medium, freeing the latter from practically all chloride ion by means of a strong anion exchange resin in the form of a salt with a weak, volatile, monobasic organic acid and from other inorganic anions, and finally to isolate cephalosporin C from the percolate, for example by adsorption on an anion exchange resin in the aceotate form and elution with pyridine acetate buffer (cf. German Pat. 1,126,564). Those processes in which cephalosporin C is adsorbed on ion exchange resins have the disadvantage that a large portion of the cephalosporin C is destroyed in the process.

The present invention provides an advantageous process in which cephaolsporin C is isolated from a dilute aqueous solution, especially a fermentation liquor, in the form of a derivative that is particularly suitable for further processing leading to potent antibacterial substances derived from 7-aminocephalosporanic acid, for example 7-phenylacetylamino-cephalosporanic acid or 7-thienyl-acetylamino-cephalosporanic acid. This new process is characterized in that N-trinitrophenyl-cephalosporin C is formed in an aqueous solution containing cephalosporin C by reaction with N-trinitrobenzenesulphonic acid, and the N-trinitrophenyl cephalosporin C is then isolated from the reaction solution.

The present process may also be used for purifying crude cephalosporin C by dissolving the latter in water or another solvent and treating this solution as described above. Furthermore, the new process may be used for purifying derivatives of cephalosporin C containing a free amino group in the side chain, for example esters of cephalosporin C.

When the new process is used for isolating the cephalosporin C contained in fermentation liquids, the reaction may be carried out in the culture filtrate or directly in the culture broth as it is obtained by the fermentation.

The reaction with trinitrobenzenesulphonic acid is advantageously carried out at room temperature and at a pH value from 7 to 10, preferably from 8.5 to 9. The trinitrobenzenesulphonic acid is added in the solid or dissolved form to the stirred solution containing cephalosporin C while keeping the pH value within the indicated range for the whole reaction period of about 1 to 2 hours. A solution of trinitrobenzenesulphonic acid is advantageously obtained by reacting picrylchloride with a sulphite, for example sodium, potassium or ammonium sulphite. The solution may be used as it is obtained. Furthermore, it is also possible to form the trinitrobenzenesulphonic acid directly in the solution containing cephalosporin C by adding, for example, picrylchloride and sodium sulphite to the solution.

On completion of the reaction the pH value is adjusted to 1 to 3, preparably 1.8 to 2, and the trinitrophenyl-cephalosporin C formed is separated, advantageously by reaction with a water-immiscible solvent or mixture of solvents, for example with a water-immiscible alcohol, especially a lower alkanol containing 4 to 6 carbon atoms, such as n-butanol, an amyl alcohol for example n-amyl alcohol, n-hexanol or 2-ethyl-n-butanol; or benzyl alcohol; or with an ester, especially a lower alkyl ester of a lower alkanoic acid such as acetic, propionic or butyric acid, for example ethyl acetate or butylate; or with a water-immiscible ketone, especially a di-lower alkyl-ketone, for example diethylketone or methylisobutylketone; or with an unsubstituted or substituted (especially chlorinated) hydrocarbon, for example a chlorinated alkane such as methylenechloride, chloroform or ethylenechloride; or a mixture of these solvents. Further suitable for the extraction are liquid, basic ion exchangers in the solvents or solvent mixtures mentioned, for example Amberlite LA-2 in n-butyl acetate or in 2-ethyl-n-butanol.

Instead of extracting the trinitrophenyl-cephalosporin it may be precipitated from the solution, for example by adjusting the pH value to 1 to 3, preferably to 1.8 to 2.

To convert trinitrophenyl-cephalosporin C into 7- amino-cephalosporanic acid the compound may be esterified and converted into 7-amino-cephalosporanic acid, for example, by the process disclosed in British specification 1,041,985.

The following examples illustrate the invention.

EXAMPLE 1

370 litres of a culture broth containing cephalosporin C are mixed with a solution of 2.72 kg. of oxalic acid in 10 litres of water and 0.9 litre of a mixture containing equal parts by volume of water and concentrated sulphuric acid so that a pH value of 3 is attained. Then 8 kg. of Celatom (diatomaceous earth) are added as filtering assistant and the whole is filtered in a filter press. The clear filtrate (320 litres) contains 1.57 g. of cephalosporin C per litre. The moist filter cake (62 kg.) is discarded.

The filtrate is added to a solution of 920 g. of sodium 2,4,6-trinitrobenzenesulphonate of pH=7.5, obtained by dissolving 796 g. of anhydrous sodium sulphite in 3.35 litres of deionized water, adding 1 kg. of ice and stirring in within 15 minutes a solution of 1.425 kg. of picrylchloride in 4.35 litres of acetone. The pH value of the stirred solvent mixture is adjusted with concentrated sodium hydroxide solution to 9.0 and then maintained at 8.5–8.7 for 4 hours at 26° C. The clear, red reaction solution, which contains 2,4,6-trinitrophenyl-cephalosporin C, is extracted in a counter-current extractor with methylisobutylketone at a pH value from 1.5 to 2.0 adjusted by means of 5 N-sulphuric acid. 190 litres of methylisobutylketone extract are obtained which is extracted in a counter-current extractor with a 0.2 molar phosphate buffer at pH 8. There are thus obtained 95 litres of an aqueous extract of pH=6, from which 2,4,6-trinitrophenyl-cephalosporin C is once more extracted with methylisobutylketone at pH 2. The resulting 50 litres of organic solution are extracted with 3 x 4 litres of water at pH 6. The aqueous extract obtained in this manner (12 litres) is cooled to 0 to 4° C., the pH value is adjusted to 2.0 with 6 N-hydrochloric acid, and the precipitate is suctioned off and washed with ice-cold water. After drying, there are obtained 751 g. of crude 2,4,6-trinitrophenyl-cephalosporin C. Another 269 g. of this product is obtained from the filtrate. The thin-layer chromatogram on silica in the system n-butanol+glacial acetic acid+water (75:7.5:21) reveals for 2,4,6-trinitrophenyl-cephalosporin C, referred to picric acid as reference substance, an $R_{fp}$-value of 0.51. In addition thereto there are spots of more polar and less polar 2,4,6-trinitrophenyl compounds. The conversion of the derivative into 7-aminocephalosporanic acid (7-ACA) may be carried out thus:

(a) 200 g. of crude 2,4,6-trinitrophenyl-cephalosporin C are suspended in 2 litres of methylisobutylketone and mixed with a solution of 200 g. of diphenyldiazomethane (prepared by oxidation of benzophenone hydrazone with manganese dioxide) in 600 ml. of methylisobutylketone. After 1½ hours the red-violet solution is run into 10 litres of petroleum ether, whereupon the crude 2,4,6-trinitrophenyl-cephalosporin C dibenzhydryl ester settles out as a light-yellow powder. This precipitate is suctioned off, washed with petroleum ether and dried under vacuum at 40° C. In the thin-layer chromatogram on silica in the system toluene+acetone (8:2) the product reveals an $R_f$-value of 0.53. Yield: 280 g. of the diester of 44% purity, corresponding to a yield of 62% referred to the cephalosporin C contained in the culture filtrate.

(b) 9.6 grams of the dibenzhydryl ester obtained sub (a) above are dissolved in 260 ml. of absolute methylenechloride. The solution is cooled to −18° C. and 5 ml. of anhydrous pyridine are added, and then a solution of 7.8 g. of phosphorus pentachloride in 100 ml. of absolute methylenechloride is stirred in dropwise within 10 minutes. The batch is stirred for 45 minutes at −12 to −10° C., and then within 5 minutes 64 ml. of methanol cooled to −10° C. are added. The solution is further stirred for 40 minutes at −10° C. and then for one hour at +10° C., whereupon 110 ml. of 2 N-hydrochloric acid are stirred in. The phases are separated and the aqueous phase is extracted further with 100 ml. of methylenechloride. The combined methylenechloride phases are cautiously evaporated under vacuum and dried in a high vacuum, to furnish a resinous, brown residue of crude 7-aminocephalosporanic acid benzhydryl ester.

(c) A solution of the 7-ACA-benzhydryl ester in 5 ml. of anisole is cooled and mixed with 14 ml. of trifluoracetic acid; the batch is allowed to react for 30 minutes at 20 to 30° C., and then a mixture, cooled to −10° C., of 25 ml. of triethylamine and 180 ml. of methanol is added. The pH value of a 10% aqueous suspension is 2.3. The pH value is adjusted to 3.5 with triethylamine (6 ml.); the whole is cooled to −18° C. and allowed to crystallize. The crystalline precipitate is suctioned off, washed successively with methanol, methylenechloride and diethyl ether and dried under a high vacuum, to yield 7-aminocephalosporanic acid in a purity of 83.3%. Yield: 1.62 g.=63.5%, referred to the 2,4,6-trinitrophenylcephalosporin C dibenzhydryl ester used.

EXAMPLE 2

10 litres of culture filtrate containing, per litre, 1340 mg. of cephalosporin C and 190 mg. of nitrogen in the form of primary amino groups, prepared by filtering a fermentation solution with addition of 2% of Celatom as filtering assistant, are mixed with 60 g. of 2,4,6-trinitrobenzenesulphonic acid; the pH value is adjusted to 8.7 and thus maintained for 2 hours. The reaction solution is then mixed with 250 g. of "Hyflo Supercel" and concentrated hydrochloric acid is stirred in until a pH value of 4.3 has been established. The yellow precipitate together with the Hyflo Supercel is suctioned off. The clear filtrate is mixed with 3 litres of ethyl acetate, the pH value adjusted with hydrochloric acid to 2.0, the phases are separated and the slightly emulsified ethyl acetate phase is clarified by filtration with the aid of 50 g. of Hyflo Supercel. The aqueous phase is further extracted with 3× 1 litre of ethyl acetate.

The combined ethyl acetate extracts are mixed with 1 litre of water and the pH value is adjusted with sodium hydroxide solution to 6.5. The phases are then separated. The ethyl acetate phase is further extracted with 3× 0.5 litre of water at pH 6.0. The combined aqueous extracts are mixed with 1 litre of ethyl acetate and the pH value is adjusted with hydrochloric acid to 2.0. The phases are separated and the aqueous phase is further extracted with 3× 0.5 litre of ethyl acetate. The combined organic extracts are washed with 2× 0.3 litre of a saturated sodium chloride solution, dried over anhydrous sodium sulphate and concentrated to ½ litre; this concentrated solution of 2,4,6-trinitrophenyl-cephalosporin C is mixed with 0.2 litre of a 47.5% solution of diphenyldiazomethane in petroleum ether while being slightly cooled. After 1¾ hours at room temperature 2,4,6-trinitrophenyl-cephalosporin C dibenzhydryl ester is precipitated by being poured into 3.5 litres of petroleum ether, and the precipitate is suctioned off and dried under vacuum at 40° C. yield: 51.2 g. of product containing 40.4% of cephalosporin, that is to say 76.2% of theory, referred to the cephalosporin C present in the culture filtrate.

EXAMPLE 3

A suspension of 11.76 g. of picrylchloride in 36 ml. of n-butanol is mixed with a solution of 6.6 g. of anhydrous sodium sulphite in 72 ml. of water. After having stirred the solution for 30 minutes, its pH value is 6.5. The red reaction mixture, which contains 15 g. of sodium 2,4,6-trinitrobenzenesulphonate, is added to 6 litres of an aqueous solution of enriched cephalosporin C (calculated content of the sodium salt of cephalosporin C: 12.3 g.; content of nitrogen in the form of primary amino groups: 1.9%). The pH value is adjusted with sodium hydroxide solution to 9.0 and then maintained for one hour at 8.5 to 8.7. The reaction solution is then mixed with 1 litre of a mixture of n-butylacetate+n-butanol (1:1) and the pH value is adjusted with hydrochloric acid to 2.0. 10 minutes later the phases are separated. The aqueous phase is further extracted with 2× 500 ml. of a mixture of n-butylacetate and n-butanol. The organic extracts are combined, adjusted with sodium hydroxide solution to pH 5.5, and extracted with 300 ml., then with 200 ml. and finally with 100 ml. of water. The combined aqueous solution are again extracted at pH 2 with the above n-butylacetate+n-butanol mixture (100 ml., then 2× 50 ml.), and the organic extracts are again extracted at pH 5.5 with water (100 ml., then 2× 50 ml.). The total of 200 ml. of aqueous solution is mixed with 10 g. of "Hyflo Supercel," cooled to 0 to 4° C., and the pH value is adjusted with 2 N-hydrochloric acid to 1.8 to 2.0, whereupon 2,4,6-trinitrophenyl-cephalosporin C precipitates; it is suctioned off together with the filter assistant, washed with ice-cold deionized water and dried for 15 hours at 40° C. Yield: 18.07 g. of 2,4,6-trinitrophenyl-cephalosporin C on 10 g. of "Hyflo Supercel." The thin-layer chromatogram on silicagel in the identical system as in Example 1 reveals, apart from the $Rf_P$-value of 0.51, also spots of more polar and less polar trinitrophenyl compounds.

The product thus obtained may be converted into the dibenzhydryl ester in the following manner:

The precipitated mixture is suspended in 180 ml. of n-butylacetate and 36 g. of diphenyldiazomethane in 180 ml. of n-butanol are added. The suspension is stirred for 3 hours, the "Hyflo Supercel" suctioned off, and the clear filtrate is run within 20 minutes into 1800 ml. of petroleum ether (B.P. 50–70° C.). The light-yellow precipitate of crude 2,4,6-trinitrophenyl-cephalosporin C dibenzhydryl ester is suctioned off, washed with petroleum ether and dried under vacuum at 40° C. The yield amounts to 24.7 g. (66% pure)=65.3% referred to the cephalosporin C contained in the starting solution.

EXAMPLE 4

A solution of 17.3 g. of picrylchloride in 35 ml. of n-butylacetate is mixed with a solution of 9.8 g. of anhydrous sodium sulphite in 60 ml. of water, and the whole is vigorously stirred for 15 minutes, during which the butylacetate phase loses its colour and the aqueous phase, which contains 22 g. of sodium 2,4,6-trinitrobenzenesulphonate, turns deep red. The red solution is added to 6 litres of an aqueous solution of crude cephalosporin C (calculated 12 g.; content of primary amino groups: 1.3%); the pH value is adjusted with sodium hydroxide solution to 9 and the batch is stirred for 2 hours at pH 8.5–8.7, and then processed according to Example 3, to yield 21.8 g. of crude 2,4,6-trinitrophenyl-cephalosporin C on 40 g. of Hyflo Supercel.

By esterification with 43.6 g. of diphenyldiazomethane as described in Example 3 there are obtained 28.65 g. of 2,4,6-trinitrophenyl-cephalosporin C dibenzhydryl ester (55% pure), corresponding to 64.6% of the theoretical yield.

I claim:

1. Process for isolating cephalosporin C in the form of the N-trinitrophenyl derivative, wherein in a dilute, aqueous cephalosporin C-containing solution N-trinitrophenyl-cephalosporin C is formed by reaction with trinitrobenzene sulfonic acid and then separated from the solution.

2. Process according to claim 1, wherein a culture broth containing cephalosporin C is used as starting material.

3. Process according to claim 1, wherein the reaction is performed at room temperature.

4. Process according to claim 1, wherein the reaction is performed at a pH of 7–10, preferably 8.5 to 9.

5. Process according to claim 1, wherein the trinitrobenzenesulfonic acid is used in the form of a solution obtained by reacting pricrylchloride with a sulfite.

6. Process according to claim 1, wherein the N-trinitrophenyl-cephalosporin C is separated from the solution by extraction.

7. Process according to claim 6, wherein the N-trinitrophenyl-cephalosporin C is extracted at a pH of 1–3, preferably 2.

8. Process according to claim 6, wherein the N-trinitrophenyl-cephalosporin C is extracted by means of a water-immiscible solvent or solvent mixture.

9. Process according to claim 6, wherein the N-trinitrophenyl-cephalosporin C is extracted by means of liquid ion exchanger.

References Cited

UNITED STATES PATENTS 3,270,009  8/1966  Flynn _____ 260—243

NICHOLAS S. RIZZO, Primary Examiner